Patented Mar. 15, 1949

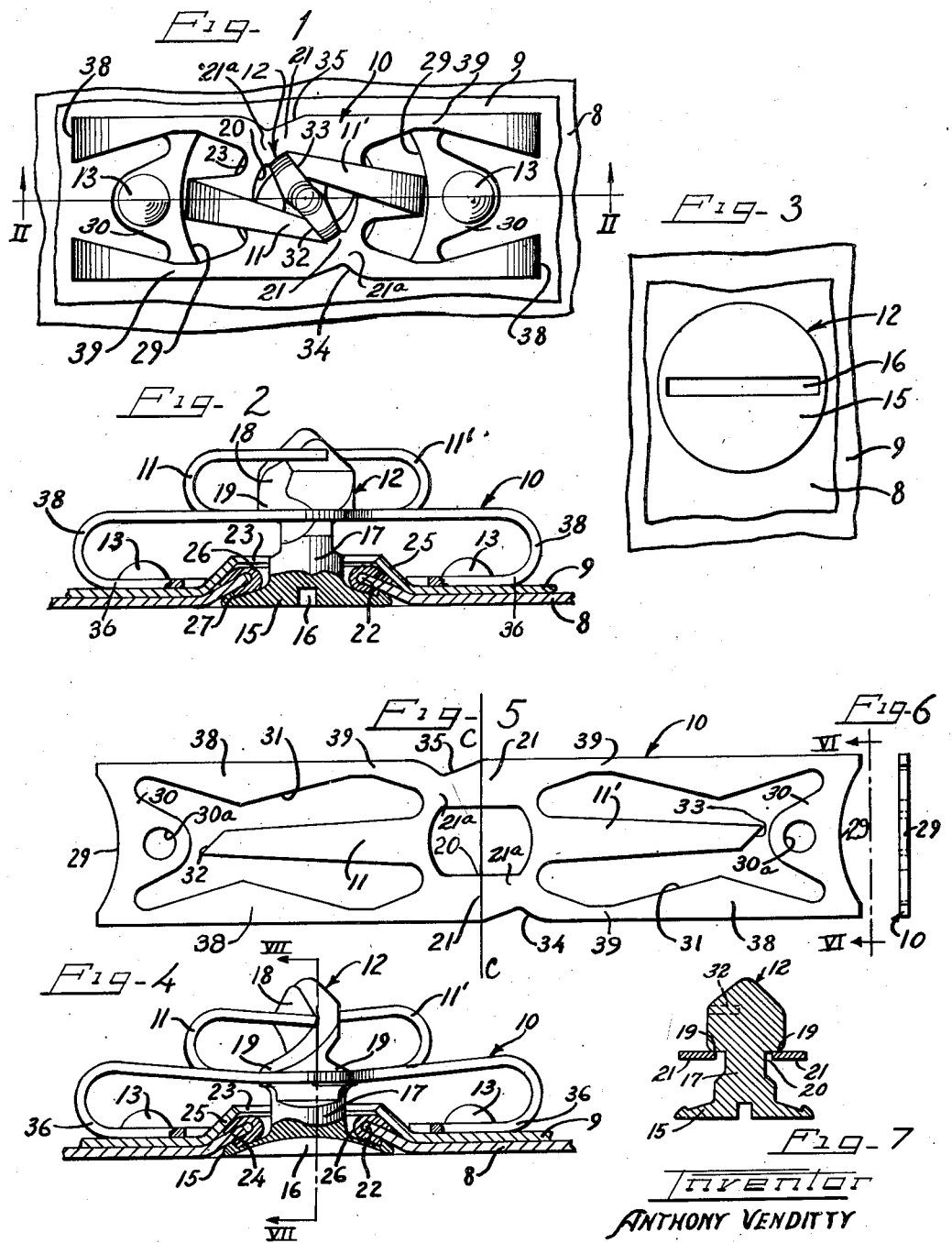

2,464,422

UNITED STATES PATENT OFFICE 2,464,422

FASTENER SPRING RECEPTACLE

Anthony Venditty, Detroit, Mich., assignor to Thompson Products, Inc., Cleveland, Ohio, a corporation of Ohio Application August 28, 1943, Serial No. 500,305

3 Claims. (Cl. 24—221)

1

This invention relates generally to fasteners and, more particularly, to a self-locking fastener for detachably connecting a plurality of parts, such as apertured plates, together.

More particularly, this invention relates to a spring receptacle for a separable fastener embodying means for preventing unauthorized or accidental detachment of the parts of the fastener and is particularly useful, therefore, in detachably connecting inspection plates on airplanes, airplane cowling, automotive paneling and the like.

An object of this invention is to provide an improved form of spring receptacle for such separable fasteners employed in detachably connecting a plurality of parts together and for retaining the parts in connected relation even though the assembly is subjected to extreme vibration normally tending to disconnect the parts.

Another object of the present invention is to provide a resilient receptacle which will accommodate a stud or other like locking means which will enable the fastener to be locked or unlocked upon a quarter turn or rotation of the stud or locking means and which provides means for preventing unauthorized unlocking of the parts.

Still another object of the present invention is to provide a resilient receptacle of the above mentioned type which is so designed as to provide a greater proportion of the material for those portions of the unit which receive the maximum stress and lesser material at points of minimum stress so that the distribution of stress throughout the entire receptacle will be substantially uniform.

Still another object of the present invention is to provide a blank of sheet material of substantially uniform thickness apertured to provide the required engaging and locking means for the spring receptacle fabricated therefrom and so designed as to provide for the uniform distribution of stress throughout the article, so as to resist breakage at points of maximum stress and to increase the life of the parts fabricated therefrom.

A still further object of the present invention relates to the provision of a novel form of spring receptacle for a separable fastener which may be economically manufactured on a large production basis.

In accordance with the general features of this invention there is provided, among other things, a blank for the fabrication of a spring receptacle comprising a strip of sheet material of substantially uniform thickness having a plurality of apertures therein which are so disposed and formed that the remaining strip material surrounding said apertures transmits a substantially equivalent stress to all portions of the strip when in use.

Other objects and features of this invention will more fully appear from the following detail description taken in connection with the accompanying drawings which illustrate a single embodiment thereof, and in which:

Figure 1 is a plan view of one form of separable fastener in locked position showing it applied to two cooperable plates which are illustrated as being broken away;

Figure 2 is a sectional view taken along the line II—II of Figure 1 with the spring receptacle and the stud partly in elevation and also differing from Figure 1 in that the stud is shown in its unlocked position;

Figure 3 is a bottom view of the structure shown in Figure 1 illustrating the position of the screw driver slot in the stud when the stud is in its locked position;

Figure 4 is a sectional view partly in elevation similar to Figure 2 but showing the stud in its locking position;

Figure 5 is a plan of the stamping from which the spring receptacle is fabricated in flat form prior to the bending of the fingers and the ends of the stamping;

Figure 6 is an end view of the blank illustrated in Figure 5, taken on the line VI—VI of Figure 5; and Figure 7 is a vertical cross-sectional view, with parts omitted, taken substantially along the line VII—VII of Figure 4.

As shown on the drawings:

The reference characters 8 and 9 designate generally two parts or plates such as the cowling on an airplane, which are to be connected and locked together as by means of my novel fastener. The upper plate 9 has supported on and fastened to it a resilient receptacle designated generally by the reference character 10. The resilient or spring receptacle 10 includes identical but oppositely disposed spaced locking fingers or arms 11 and 11' which are co-operable with a central stud 12 which engages the lower plate 8. The spring receptacle 10 is suitably secured, as for example, by rivets 13 to the surface of the upper plate 9.

The stud 12 includes a flanged base 15 having on its under surface a screw driver slot 16 by means of which said stud 12 may be turned in either direction, depending upon whether the stud is being moved to locked or unlocked position with respect to the resilient receptacle 10. As will best be seen from Figures 2 and 4, the stud 12 has extending upwardly from the base portion 15 a shank 17 having formed at its upper end a substantially helical screw portion 18.

Adjacent the junction of the helical screw portion 18 and the shank 17 of stud 12 are formed a pair of shoulders 19 which merge with the curved surfaces of the helical screw portions 18, thereby permitting the stud to be passed through the elongated aperture 20 disposed centrally of the spring receptacle 10 so as to disengage the same when the stud is moved to a completely unlocked position. When the stud is in its locked position, as indicated in Figures 4 and 7, the shoulders 19 disposed diametrically opposite each other overlap the portions 21 of the upper surface of the spring receptacle 10 adjacent the elongated aperture 20 and cause this portion of the receptacle to deflect slightly as indicated in Figure 4 thereby drawing the parts or plates 8 and 9 into tight engagement.

It will be noted from Figures 2 and 4 of the drawings that the shank 17 of the stud 12 is adapted to extend not only through the elongated aperture 20 of the spring receptacle 10 but also through apertures 22 and 23 in the plates 8 and 9 respectively. These apertures 22 and 23 are advantageously formed in the manner of a countersunk hole having associated therewith the projecting collar portions 24 and 25 which define said openings 22 and 23 of the plates 8 and 9, respectively. The collar portions 24 and 25 are adapted to be disposed in concentric relation in order that the former may be nested or located within the latter so as to receive the flanged base 15 of the stud 12 which is adapted to register with the collar portion 24 and to be flush with the under surface of the plate 8.

Co-operating with the collar portions 24 and 25 to prevent the stud 12 from becoming disengaged or falling out of the plate 8 when the stud is moved to unlocked position, there may be provided in engagement with the upstanding edge of collar portion 24 associated with the opening 22 in the plate 8, a grommet 26. The grommet 26 is of such size and shape as to engage the contiguous surfaces of collar portions 24 and 25 and an upwardly projecting annular bead 27 disposed on the upper side of the flanged base 15 and encircling the shank 17 of the stud 12. The internal diameter of the grommet 26 is such as to prevent passage of the shoulders 19 through the grommet. The stud 12 is thus held in place with respect to the aperture 22 in the plate 8 and thereby prevented from falling out of said plate when it is in unlocked position with respect to the spring receptacle 10.

The present invention is particularly concerned with the formation of the blank and the spring receptacle 10 which is fabricated therefrom by a simple bending operation. The blank illustrated in Figures 5 and 6 of the drawings, and indicated generally by the reference character 10, is shown in flattened out form before being fabricated into the spring receptacle illustrated in Figures 1, 2 and 4 and hereinbefore described.

The blank 10 comprises a metallic stamping which is provided at its opposite ends with the inwardly projecting arcuate indentations 29 which serve to aid in locating the spring receptacle 10 with respect to the upwardly projecting collar portion 25 defining the aperture 23 in the plate 9. Adjacent the indentations 29 at each end of the blank is formed an apertured ear portion 30 with an aperture 30a therethrough which accommodates the rivet 13 employed in securing the spring receptacle 10 to the plate 9. Intermediate the ends of the blank 10 is formed the elongated aperture 20 which accommodates the stud 12 in the manner previously described.

An irregularly shaped opening 31 is provided between each of the apertured ears 30 and the centrally disposed elongated aperture 20 and forms therewithin the longitudinally extending arm 11. By virtue of the angularly disposed edges 32 and 33 as indicated on the arms 11, the openings 31 are rendered asymmetrical with respect to their longitudinal axes. The notches 34 and 35 are formed in the edges of the blank 10 on opposite sides of the elongated aperture 20 and are also oppositely disposed with respect to the transverse center line C—C, Figure 5, of the blank extending through the center of the elongated aperture 20. These notches form localized narrow portions 21a in the portions 21.

In the formation of the spring receptacle 10 from the blank just described, the arms 11 are suitably curved upwardly over the surfaces 21 adjacent the elongated aperture 20 so that their inclined diagonal edges 32 and 33 are arranged in spaced relationship directly above the elongated aperture 20 as indicated in Figure 1. The ends of the stamping are turned back under the surfaces 21 of the blank to provide the horizontally disposed U-shaped leg portions 36 for resiliently supporting the surfaces 21 of the spring receptacle 10 in spaced relation to the surface of the plate 9 to which the receptacle is attached.

In addition to the engagement of the shoulders 19 with respect to the surfaces 21 of the spring receptacle 10 when the stud is in locked position, the opposed surfaces of the helical screw portion 18 of the stud 12 are adapted to engage the inclined edges 32 and 33 of the arms 11. As will be seen from Figure 1, the engagement between the surfaces of the helically formed screw portion 18 and the inclined ends of the arms 11 and 11' thus prevents the stud from rotating after it has been turned into its locked position. The stud 12 will remain in the position indicated, being held there by the inclined edges 32 and 33 of the arms 11 and 11' against the vibration or other operational shocks or jars resulting from the mechanism with which the cowling structure or other parts to be secured are associated. The stud 12 is, however, readily capable, upon the use of a suitable instrument such, for example, as a screw driver engaging the slot 16 in the base 15 of the stud, of being rotated out of contact with the arms 11 and 11' so as to enable the stud 12 to be disengaged from the spring receptacle 10 when desired.

Careful consideration has been given to the design of the blank structure illustrated in Figure 5 of the drawings. The specific shape and arrangement of the openings 31, the notches 34 and 35, together with the centrally disposed elongated aperture 20, have been found to provide a highly satisfactory structural configuration. The arrangement referred to provides additional bordering material in the blank at the points where the stresses experienced in the spring receptacle fabricated therefrom are the greatest, and a lesser amount of bordering material in those portions of the blank where the least amount of stress will be encountered. The design is, therefore, particularly advantageous for the reason that spring receptacles fabricated from such blanks are found to have a longer life and to be capable of uniformly distributing throughout the entire spring receptacle the stress exerted thereon by the operating engagement with the stud 12. Thus no part of the spring receptacle 10 receives more operational stress than any other.

It will be noted that the portions 38 and 39 of the bordering material adajcent to the openings 31 differ materially in their plane dimensions. The portion 38 is, as will be seen from Figure 1, the part of the blank 10 from which the legs 36 are formed, being bent back under the portions 21 of said blank. These portions 38 must of necessity be greater for the reason that they accept a greater proportion of the stress exerted upon the spring receptacle 10 when in use. Contrarily, the portions 39, while they may be stressed to a certain extent when the stud 12 is in locked position due to the depressing of the portion 21 of the blank 10 when formed into the spring receptacle, they do not, however, encounter the same degree of stress as that experienced by the portions 38. In the same way, the notches 34 and 35 are provided in the edges adjacent the portions 21 of the blank 10 so as to provide portions of somewhat lesser cross-sectional area at the points of lesser stress.

Obviously, spring receptacles employing other forms of locking means which differ from that of the stud 12 illustrated herein, will require a slightly different design, size and disposition of the openings, notches and apertures to provide a uniform stress throughout the unit. Any modifications in structures may, therefore, be made to correspond generally with the particular conditions attendant upon the use of the spring receptacle without, however, departing from the spirit and scope of the present invention.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In a fastener adapted for detachably connecting a plurality of parts including a part having a collar portion thereon, the improvement of a spring receptacle for a locking stud extending through the parts, said receptacle having spaced opposed mounting portions with concave inner ends adapted to straddle the collar portion and having apertured ear portions extending laterally outward from said ends overlying the part and receiving means for securing the spring receptacle thereto, a pair of U-shaped legs extending upwardly from each of said mounting portions in spaced relation to the apertured portions and merging with a central portion having an elongated stud-receiving aperature, said central portion having narrow portions adjacent diagonally opposite corners of the aperture, said legs increasing in width from the extremities of the U adjacent the mounting portion and the central portion to the midpoint of the bight in the U, and a pair of oppositely bent arms each with an inclined end overlying said elongated aperture adjacent each end of the central portion for engaging a stud extending through said aperture to hold the stud against unauthorized rotation.

2. A fastener spring receptacle for detachably fastening a plurality of parts together and adapted to provide throughout the unit a substantially uniform distribution of stress, said receptacle having spaced mounting portions for mounting the receptacle on at least one of the parts to be fastened together, locating means adjacent said mounting portions for locating the receptacle with respect to one of the parts to be fastened together, a depressable central portion having an elongated aperture disposed centrally thereof, notches disposed in the edges of the central portion for increasing the flexibility of the central portion and distributing any stress introduced in the central portion uniformly throughout said central portion, and a pair of legs each having a bowed portion intermediate its ends, said legs supporting each extremity of the central portion from each of said mounting portions, said legs having greater width at their intermediate bowed portions than at the extremities thereof defined by the mounting portion and the central portion for distributing the stress uniformly from said central portion to said mounting portions.

3. A fastener receptacle adapted for coacting with a fastener stud to detachably connect a plurality of parts including a part having a collar portion thereon, said receptacle having spaced opposed flat mounting portions with concave inner ends adapted to straddle the collar portion, a pair of legs on the outer end of each mounting portion with each leg having a bowed portion intermediate its ends, the legs of each pair being spaced apart and each pair of legs extending from one of said flat portions to an apertured stud-receiving central portion adapted to overlie the collared portion, arms extending from said central apertured portion between said spaced apart legs into overlying relation with said apertured central portion and having opposed ends for coacting with a stud passed through the apertured central portion, and said receptacle being of uniform thickness throughout but having the portions thereof of varying width to distribute substantially equivalent stresses throughout all portions.

ANTHONY VENDITTY.

REFERENCES CITED

The following references are of record in the file of this patent:

UNITED STATES PATENTS

| Number | Name | Date |
| --- | --- | --- |
| 1,165,706 | Peterson | Dec. 28, 1915 |
| 1,331,928 | Katzung | Feb. 24, 1920 |
| 1,941,892 | Greve | Jan. 2, 1934 |
| 2,010,519 | Jones | Aug. 6, 1935 |
| 2,140,764 | Reiter | Dec. 20, 1938 |
| 2,174,030 | Boyer | Sept. 26, 1939 |
| 2,238,865 | Purinton | Apr. 15, 1941 |
| 2,261,369 | Henry | Nov. 4, 1941 |
| 2,276,694 | Henry | Mar. 17, 1942 |
| 2,287,691 | Marchou | June 23, 1942 |
| 2,307,132 | Hufferd | Jan. 5, 1943 |